United States Patent Office 3,382,223
Patented May 7, 1968

3,382,223
PROCESS FOR THE PRODUCTION OF VINYL-
CHLORIDE POLYMERS BY LOW-TEMPERA-
TURE POLYMERIZATION
Giancarlo Borsini, Milan, Carlo Nicora, Varese, and
Lorenzo Ratti, Chavenna, Sondrio, Italy, assignors to
Montecatini Edison S.p.A., Milan, Italy
No Drawing. Continuation-in-part of application Ser. No.
444,811, Apr. 1, 1965. This application Mar. 11, 1966,
Ser. No. 533,403
Claims priority, application Italy, Mar. 17, 1965,
5,811/65
8 Claims. (Cl. 260—92.8)

ABSTRACT OF THE DISCLOSURE

A process for the production of vinylchloride polymers and copolymers by the polymerization at a temperature between substantially 0° C. and −60° C. of a monomeric component containing at least 75% vinylchloride in the presence of a redox-catalyst system consisting essentially of a tetraalkyl lead, a tetravalent-cerium salt and a solvent for said salt, in which the polymerization reaction is terminated at a predetermined degree of conversion of said monomeric component to polymer by introducing into the reaction mass between 0.001 and 5 parts by weight per 100 parts by weight of the monomeric component of at least one polymerization-stopping agent from the group of ascorbic acids, dihydroxy maleic acids, their anhydrides and the oxidation products of carbohydrates, such as glucose and the like, with hydrogen peroxide and ferrous salts.

This application is a continuation-in-part of our copending application Ser. No. 444,811 filed Apr. 1, 1965 and entitled "Process for the Production of Polyvinyl Chloride with High Stereoregularity."

The present invention relates to the polymerization of vinylchloride to form homopolymers and copolymers thereof with a high degree of stereoregularity and, more particularly, to the low-temperature production of polyvinyl chlorides of a highly crystalline character and to a method of terminating polymerization process at any desired point in the polymerization process.

There have been many processes proposed for the polymerization of vinylchlorides and most of these earlier processes are carried out at a relatively high temperature (e.g. about 50° C.) such that upon attainment of the desired degree of conversion of the monomeric component to the polymer, the reaction mass is rapidly cooled in order to avoid postpolymerization and the unreacted monomer is then recovered. In instances in which postpolymerization of amounts of monomer physically retained in the polymer is to be avoided, as in cases in which the polymer must be prepared with precise properties which are alterable by such postpolymerization, the reaction mixture is added to a polymerization-terminating medium or a polymerization-terminating agent is supplied to the reaction medium.

Low-temperature polymerization methods for the production of vinylchloride polymers and copolymers have gained prominence as a consequence of the high degree of crystallinity and stereoregularity of the resulting polymers and their highly advantageous physical and chemical properties as well as their uniformity. It has not been possible heretofore, however, to employ those techniques which have become conventional in higher-temperature-polymerization methods for the termination of polymerization reactions at the low temperatures (generally less than 0° C.) characterizing low-temperature polymerization. For one thing, rapid cooling of the reaction mass is not practical and indeed is generally ineffective. Furthermore, systems involving the heating of the polymer to drive out the monomer by vaporization have proved even more disadvantageous because the higher temperatures promote postpolymerization and severe alteration of the properties of the resulting polymer. Thus, on the one hand, postpolymerization of occluded monomer is even more deleterious with respect to the quality of the polymer produced in low-temperature systems which are resorted to precisely because of the desirable characteristics to be expected from the method and, on the other hand, prior-art methods of terminating rapidly the polymerization process have failed to be effective at the conditions utilized for low-temperature polymerization.

In the copending application mentioned above we have described a particularly satisfactory low-temperature polymerization process which is characterized by a high rate of polymer production as well as a high degree of stereoregularity and crystalline quality as represented by the syndiotactic index of the polymer and with which prior-art methods of terminating the polymerization at a predetermined point in the conversion of the monomer to the polymer have been found to be ineffective. In the improved process, the polyvinyl-chloride polymers and copolymers are produced in the presence of a redox (reduction-oxidation) catalytic system including at least one ceric-based oxidizing substance and at least one organometal compound of a metal from group IV(A) of the Periodic Table—long form (Handbook of Chemistry and Physics, 41 edition; Chemical Rubber Publishing Company, Ohio, pp. 448, 449) and preferably selected from the group consisting of germanium, tin and lead. According to this development, as described in our copending application, the organometallic compound has the general formula

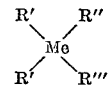

where Me is the metal (i.e. germanium, tin or lead), and each R′ represents an organic radical selected from the group consisting of aralkyl, cycloalkyl, aryl and alkyl radicals; R″ and R‴ may be the same or different and represent single-valance groups such as aralkyl, cycloalkyl, aryl and alkyl radicals or polar members such as a halogen ion, nitrate ($NO_3^-$), alkoxy and carboxyl groups and the like; R″ and R‴ can also represent individual valences of a divalent group (e.g. $SO_4^=$). The oxidizing agent of this catalyst system is a ceric compound, i.e. includes tetravalent cerium, and it is preferred that the organometallic compound constitute the sole reducing agent present with the ceric-derivative oxidizing agent in the reaction system at least during the polymerization operation and prior to the termination thereof. It has been observed that this catalyst system is highly effective and active at temperatures which reduce the polymerization rate of conventional redox systems and we have found that the best results are obtainable by using tetraorganometallic derivatives of tin and lead, the most satisfactory compounds being the tetramethyl, tetraethyl, tetrabutyl and tetraphenyl compounds of these metals, e.g. $(C_4H_9)_4Sn$, $(C_6H_5)_4Sn$, $(CH_3)_4Pb$ and $(C_2H_5)_4Pb$. Suitable ceric compounds are the ceric salts which are soluble in the polymerization medium and include ceric nitrate, ceric sulfate, ceric ammonium sulfate, ceric ammonium pyrophosphate, ceric ammonium nitrate, ceric iodate and ceric perchlorate. These organometal derivatives and ceric compounds may be used individually or in mutual admixture and we have discovered, in connection with this polymerization system, that best results are obtained when the cerium-containing oxidizing agent is an ammonium-containing ceric salt of a strong inorganic acid such as sulfuric, nitric or pyrophosphoric acid. The monomeric system subjected to polymerization in accordance with this method should consist at least 75% by weight of vinylchloride and possibly monomers capable of polymerization with vinylchloride to the limited extent indicated which are compatible with vinylchloride, including acrylonitrile and vinylacetate. The reaction is preferably carried out in the presence of a solvent containing hydroxyl groups, ether linkages and the like. Suitable solvents of this type include methanol, ethanol, dioxane, tetrahydrofurane and acetonitrile.

Most advantageously, the polymerization system contains from 0.01 to 3 parts by weight of the organometallic compound or compounds mentioned above and from 0.001 to substantially 1 part by weight (in terms of metallic cerium) of the ceric salt per 100 parts by weight of monomeric component (containing at least 75% vinylchloride). Such a system has been found to produce polymers with a high degree of crystallinity and stereoregularity with syndiotactic indices (IS) between 2 and 2.8, depending upon the polymerization temperature. Moreover, the products have molecular weights ranging from substantially 20,000 to 200,000 and have been prefectly suitable for use in films and fibers as well as in the container industry, for tubes and manufactured goods resistant to attack by boiling water and chlorinated solvents and, as a rule, all substances capable of swelling conventional polyvinyl chlorides.

It will be understood that the system described above and constituting the subject of our copending application Ser. No. 444,811 distinguishes over prior methods of polymerizing unsaturated monomeric components using cerium salts and other reducing agents than the tetra-organometal compounds specifically described. In such prior systems, the polymerization is carried out at temperatures far in excess of those in which our improved system is capable and the use of reducing agents such as hydroquinone, sodium sulfite and ferrous sulfate is substantially ineffective to stop the polymerization reaction at temperatures well below room temperature or the higher temperatures used with conventional systems. A stopping agent for the low-temperature improved polymerization method must be capable of acting at temperatures well below 0° C. and, generally, less than —20° C. In fact, the improved catalytic system of our copending application operates most effectively at temperatures as low as —40° to —60° C. Furthermore, the conventional stopping agents, which are adapted to perform at temperatures above 20° C. and fail completely at temperatures below zero ° C., give rise to the presence of undesirable residues in the product and are capable of detrimentally coloring the polymer and altering its thermostability. Such deleterious effects are absolutely inadmissible when the product is to be used as a film-forming or fiber-forming substance.

It is, therefore, an important object of the present invention to provide an improved low-temperature polymerization method for the production of vinylchloride polymers of high stereoregularity which can be carried out, without the disadvantages of prior polymerization-halting techniques, to any desired degree of conversion of a monomeric component to the polymer.

A further object of this invention is to extend the principles set forth in our copending application Ser. No. 444,811 to a method of producing vinylchloride polymers with excellent control of the termination of the polymerization reaction and thus the degree of monomer conversion without reducing the quality of the polymer which is produced, or giving rise to undesirable contamination thereof.

Yet another object of this invention is to provide an improved method of terminating low-temperature polymerization reactions utilizing catalyst systems containing tetravalent-cerium compounds and organometallic derivatives of germanium, tin or lead.

These objects and others which will become apparent hereinafter are attained, in accordance with the present improvement, in a method of polymerizing a monomeric component, in accordance with our copending application Ser. No. 444,811, which further includes the step of terminating the reaction at a predetermined degree of conversion of the monomeric component to the polymer by treating the reaction mixture with a compound selected from the class comprising ascorbic acid, dihydroxymaleic acid, their anhydrides and the oxidation products of carbohydrates, such as glucose, saccharose, fructose and the like, with hydrogen peroxide and ferrous salts.

A particularly preferred group of these substances includes ascorbic acids in all forms and more particularly the laevo-, dextro- or the iso- configurations of 2,3,4,5,6-penta hydroxyhex-2- enoic acid and the delta lactones produced therefrom. A particularly preferred group of these substances includes the ascorbic acid in all its forms and more particularly the laevo-, the dextro or the iso- configurations of the 2,3,4,5,6-pentahydroxy hex-2-enoic acid and the delta lactone produced therefrom. Surprisingly, compounds of this nature are effective to terminate a polymerization reaction at low temperature even though, and in spite of the fact that, such compounds have hitherto been proposed as free-radical polymerization initiators capable of catalysis of a polymerization reaction in their own right. Thus, it has been found, totally unexpectedly, that compounds of this type can be used to stop short a low-temperature polymerization reaction catalyzed by the redox systems of our copending application mentioned above at any desired degree of conversion of monomeric component to the polymer. We have also discovered that such agents are also effective as bleaches and act upon the polymer obtained in the reaction to whiten same and remove any traces of coloration derived from the use of the ceric salt. By contrast with earlier systems using cerium-containing catalysts, the product obtained from the process of the present invention is white or substantially white and contains none of the coloring matter usually entrained in the polymer and retained thereby through numerous washings. Furthermore, the present method provides the ability to terminate the polymerization reaction without the production of undesirable polymers when thermal control of the reaction is lost and thus permits the recovery of unreacted monomer and nondepleted catalyst.

According to a more specific feature of this invention, the pH of the reaction mixture is maintained at a value no greater than 4, an upper limit which has been found to be critical for the proper operation of the stopping agent. Thus, the present invention provides, when necessary, for the addition with the stopping agent to the reaction medium or for the mixture therewith of a substance (e.g. an inorganic acid or an acidic salt) capable of lowering the pH.

We have found that best results are obtained when, working with catalyst systems as set forth in our copending application Ser. No. 444,811, the stopping agent is added to the reaction mixture at the time the termination of polymerization is required in an amount ranging between 0.001 and 5 parts by weight per 100 parts by weight of vinylchloride or of the monomeric component containing same. A preferred quantity of the stopping agent is about 0.1% by weight of the vinylchloride component.

It has been found that exceptionally good results are obtainable from the point of view of catalyst efficiency, rate of production and quality of polymer when the two components of the catalyst system are tetraethyl lead (Pb(C₂H₅)₄) and diammonium ceric hexanitrate $$(NH_4)_2Ce(NO_3)_6$$

this latter component being dissolved in a solvent, able to keep in solution the active species of the catalytic system; the catalyst components being added separately to the vinylchloride-containing monomeric component. The reaction mixture is permitted to polymerize with continuous stirring and, after the predetermined degree of polymerization has been attained, the indicated quantity of one or more of the aforedescribed stopping agents is added rapidly to the mixture with or without dilution of the stopping agent by a solvent miscible with the reaction medium. Such a solvent can include one or more of the solvents described as serving as the vehicle for the catalyst system in the polymerization reaction. Stirring of the mass is continued and it is observed that the entire mass experiences a whitening or lightening of color and shortly turns perfectly white. The polymer can then be recovered in the usual manner, e.g. by filtering, washing and drying under vacuum at a temperature of about 50° C.

Polymers prepared in this manner have a high degree of crystallinity and stereoregularity with syndiotactic indices ranging between 2 and 2.8, as previously mentioned. The syndiotactic index IS is a measure of the stereoregularity of vinylchloride polymers and is determined as indicated in Chimica e l'Industria, vol. 46, pp. 166–171, 1964, from measurement of the infrared spectrum of the polymer; in the polyvinyl chloride infrared spectrum, stereoregularity in the macromolecular chain produces its strongest effects in the region from 600 to 700 cm.⁻¹ where there are two bands of particular significance at 635 cm.⁻¹ and 692 cm.⁻¹. For this reason the ratio of absorption intensities $$\frac{I(635 \text{ cm.}^{-1})}{I(692 \text{ cm.}^{-1})}$$

of these bands is indicated as IS (syndiotactic index) and is taken as an indication of the relative amount of the syndiotactic fraction of the polymer. The measurements are experimentally obtained by dissolving the polymer in cyclohexanone at about 120° C. for 15 min. to yield a solution of 0.8 to 1% by weight of polymer. The solution is quickly cooled and evaporated at about 50° C. under a reduced pressure of 10 mm. Hg on a flat glass surface. Films are obtained having a thickness of about 20–30 microns and are subjected to I–R analysis in a Perkin-Elmer spectrophotometer (Mod. 21) at double radius with a potassium-bromide prism.

The molecular weights of the polymers are determined by the method explained in Chimica e l'Industria, volume 36, pp. 883–889, 1954, from the intrinsic viscosity of a solution of the polymer. Thus the intrinsic viscosity is measured at 25° C. for solutions of the polymer is cyclohexanone at a concentration of 0.1% by weight. The equation which relates the molecular weight of the polymer to its intrinsic viscosity is the following:

$$\mu = 2.4 \times 10^{-4} \overline{M}n^{0.77}$$

wherein $\mu$ is the intrinsic viscosity in $dl/gr$ and $\overline{M}n$ is the numerical average molecular weight. The molecular weight was found to range between 20,000 and 200,000 and the polymer was found to be perfectly white. The polymers were excellent for use in fibers and films, were resistant to attack by boiling water and chlorinated solvents which were capable of swelling conventional polyvinyl chlorides.

The following specific examples illustrate the principles of the present invention:

Example 1

500 g. of vinylchloride, 0.9 g. of (NH₄)₂Ce(NO₃)₆ dissolved in 120 cc. of methanol, and separately 3.2 cc. of Pb(C₂H₅)₄ were charged, after having completely replaced the air with nitrogen, into a flask provided with a stirrer, thermometer, nitrogen influx tube.

The polymerization was carried out at a temperature of −40° C. After 2 hrs. and 30 minutes from the beginning of the polymerization, 0.7 g. of l-ascorbic acid dissolved in 70 cc. of methanol was introduced. The mixture was kept under stirring for five minutes and in the meantime it was observed that the reaction mass decolorized, assuming a perfect white coloration.

In a nitrogen atmosphere 5 samples A–B–C–D and E were then drawn and treated as follows:

The A sample was immediately filtered, taking care to avoid all conditions which might have resulted in a post-polymerization at temperatures higher than −40° C.

The B sample was put into a thermostatically controlled bath at +40° C. and there kept for 10 minutes under stirring, allowing the vinylchloride to evaporate.

The C sample was treated in the same manner as sample B, but the time in the thermostatically controlled bath at +40° C. was extended to one hr., still maintaining the sample under stirring.

The D sample, on the contrary, was put into a thermostatically controlled bath at −15° C. and kept there under stirring for one hr. Finally the E sample was kept under stirring for 2 hrs. at −40° C. At the expiring of the indicated time intervals the 5 samples were filtered, washed, dried and weighed.

For comparison purposes the same procedure was repeated without, however, addition of the stopping agent consisting of l-ascorbic acid.

In the following Table I the conversion degree is reported for each sample, i.e. for the samples with the stopping agent and (for comparison purposes) the samples without the stopping agent i.e. the "unstopped" unstopped samples.

TABLE I

| Sample | Conversion degree, percent | Syndiotactic Index [1] |
|---|---|---|
| A (stopped) | 5.1 | 2.4 |
| A (unstopped) | 5.3 | 2.4 |
| B (stopped) | 5.3 | 2.4 |
| B (unstopped) | 6.5 | 2.3 |
| C (stopped) | 5.3 | -------- |
| C (unstopped) | 6.5 | -------- |
| D (stopped) | 5.0 | -------- |
| D (unstopped) | 6.8 | -------- |
| E (stopped) | 5.2 | -------- |
| E (unstopped) | 8.0 | -------- |

[1] The molecular weight is determined according to the method explained in "Chimica e l'Industria," vol. 36, pp. 883–889, 1954; the syndiotactic index is determined according to the method described in "Chimica e l'Industria," vol. 46, pp. 166–171, 1964. From the comparison of the conversion degrees for the various samples it can be seen that in the samples, to which l-ascorbic acid was added there is practically no post-polymerization, whereas there is a significant post-polymerization in the samples to which the ascorbic acid was not added.

Example 2

212 g. of vinylchloride, 1.35 cc. of Pb(C₂H₅)₄, 0.37 g. of (NH₄)₂Ce(NO₃)₆, this latter dissolved in 55 cc. of methanol and 0.29 g. of l-ascorbic acid were charged under an inert atmosphere into a small stainless steel autoclave of 500 cc. The whole mixture was kept under stirring for one hr. at +30° C. and it can be observed that there was no trace of polymerization. By comparison the same autoclave was charged in the same way, but after 1 hr. of polymerization at +30° C. 15.3 g. of polymer, were obtained with a conversion of 7.2%.

Example 3

500 g. of vinylchloride, 3.2 cc. of Pb(C₂H₅)₄ and 0.9 g. of NH₄Ce(NO₃)₆, this latter dissolved in 120 cc. of methanol, were charged under inert atmosphere and after having completely substituted the air with nitrogen, into a flask of 1 l. provided with a stirrer, thermometer and nitrogen influx tube.

After three hrs. from the beginning of the polymerization at −40° C., 0.6 of dihydroxy-maleic acid dissolved in 60 cc. of methanol were too introduced.

The reaction mass was maintained under these conditions for five minutes during which it was observed that the reaction mass quickly and completely decolorized assuming a perfect white coloration. Under an inert atmosphere, four samples A, B, C and D were drawn, which were treated as in Example 1. For comparison the same procedure was repeated but without addition of the stopping agent (dihydroxy-maleic acid). In the following Table II the conversion degree is reported for each sample.

TABLE II

| Sample: | Conversion |
|---|---|
| A (stopped) | 6.1 |
| A (unstopped) | 5.9 |
| B (stopped) | 6.4 |
| B (unstopped) | 7.3 |
| C (stopped) | 6.3 |
| C (unstopped) | 7.4 |
| D (stopped) | 6.2 |
| D (unstopped) | 7.6 |

From the comparison of the conversion degrees for the various samples it can be seen that in the samples, to which dihydroxy maleic acid was added as stopping agent, there is practically no post-polymerization, whereas there is a significant post-polymerization in the samples to which no dihydroxy-maleic acid was added.

Example 4

Example 2 was repeated but employing 0.25 g. of dihydroxy-maleic acid instead of 1-ascorbic acid. Still maintaining the reaction mixture under stirring for 5 hrs. at +30° C. no polymer formation was observed. Over the same period of time and operating under the same conditions, omitting however the dihydroxy-maleic acid, a conversion of 27.3% was reached.

Example 5

The procedure of Example 1 was repeated, charging 3.2 cc. of $Pb(C_2H_5)_4$ and 0.8 g. of $(NH_4)_2Ce(SO_4)_3$, this latter dissolved in 200 cc. of methanol, into a 1 l. flask. The polymerization was carried out at a temperature of −30° C. After 3 hrs. from the beginning of the polymerization 0.6 g. of iso-ascorbic acid dissolved in 60 cc. of methanol were too added. The mixture was kept under stirring for 5 minutes during which a whitening took place of the reaction mass which assumed a perfect white colour. Under a dry nitrogen atmosphere four samples A–B–C and D were drawn, which were treated as explained in Example 1. By comparison, the same procedure was repeated but omitting to add the stopping agent consisting of iso-ascorbic acid. In the following Table III the conversion degrees are reported both for the samples treated with the stopping agent and for the samples of comparison not treated with the stopping agent.

TABLE III

| Sample: | Conversion degree, percent |
|---|---|
| A (stopped) | 5.0 |
| A (unstopped) | 5.1 |
| B (stopped) | 5.2 |
| B (unstopped) | 6.4 |
| C (stopped) | 5.1 |
| C (unstopped) | 6.6 |
| D (stopped) | 5.1 |
| D (unstopped) | 6.7 |

From the comparison of the conversion degree for the various samples it can be seen that in the samples treated with isoascorbic acid there is no post-polymerization, whereas a noticeable post-polymerization takes place for the samples not treated with iso-ascorbic acid.

We claim:
1. In a process for the production of vinylchloride polymers and copolymers by the polymerization at a temperature between substantially 0° C. and −60° C. of a monomeric component containing at least 75% vinylchloride in the presence of a redox-catalyst system consisting essentially of a tetraalkyl lead, a tetravalent-cerium salt and a solvent for said salt, the improvement which comprises the step of terminating the polymerization reaction at a predetermined degree of conversion of said monomeric component to polymer by introducing into the reaction mass between 0.001 and 5 parts by weight per 100 parts by weight of said monomeric component of at least one polymerization-stopping agent selected from the group consisting of ascorbic acids, dihydroxy-maleic acid, their anhydrides and the oxidation products of carbohydrates upon reaction thereof with hydrogen peroxide and ferrous salts.

2. The improvement defined in claim 1 further comprising the step of maintaining the pH of the reaction mass below about pH 4 at least at introduction of said agent into said mass.

3. The improvement defined in claim 1 wherein said agent is 1-ascorbic acid.

4. The improvement defined in claim 1 wherein said agent is dihydroxy-maleic acid.

5. The improvement defined in claim 1 wherein said agent is iso-ascorbic acid.

6. The improvement defined in claim 1 wherein said tetravalent-cerium salt is present in said reaction mass at least initially in an amount ranging between substantially 0.001 and one part by weight, in terms of metallic cerium, per 100 parts by weight of said monomeric component and said organometallic compound is present in an amount at least initially of substantially 0.01 and 3 parts by weight per 100 parts by weight of said monomeric compound, said stopping agent being added to said reaction mass in an amount of the order of about 0.1% by weight of said monomeric component for terminating the polymerization reaction, the pH of said mass being reduced to a maximum of pH 4 by the addition jointly with said polymerization-stopping agent of at least one acid or acidic salt to the reaction mass.

7. A process for the production of vinylchloride-containing polymers comprising the steps of:
(a) forming a reaction mass by combining
a monomeric component containing at least 75% by weight vinylchloride, and
a reduction-oxidation catalyst system consisting essentially of at least one organometallic compound having the structural formula

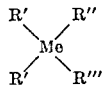

wherein Me is germanium, tin or lead, R′ represents an organic radical selected from the group which consists of aralkyl, cyloalkyl, aryl and alkyl radicals, and R″ and R‴ represent individual bonds or valences of functionalities selected from the group which consists of aralkyl, cycloalkyl, aryl and alkyl radicals and monovalent and divalent polar substituents individually or in common forming R′ and R″, a tetravalent-serium salt selected from the group which consists of ceric nitrate, ceric sulfate, ceric ammonium nitrate, ceric ammonium sulfate, ceric ammonium pyrophosphate, ceric iodate and ceric perchlorate, and an organic solvent for said tetravalent cerium salt;
(b) polymerizing said monomeric component at a temperature between substantially −60° C. and 0° C.; and
(c) terminating the polymerization reaction of step (b) by adding to said reaction mass upon the polymerization proceeding to a predetermined degree of conversion of said monomeric component to a polymer, a polymerization-stopping agent selected from the group which consists of ascorbic acid, dihydroxy-maleic acid and anhydrides thereof, and oxidation products of carbohydrates formed by reaction thereof with hydrogen peroxide and ferrous salts, said polymerization-stopping agent being introduced into the reaction mass in an amount between 0.001 and 5 parts by weight per 100 parts by weight of said monomeric component.

8. The process defined in claim 7, further comprising the step of adjusting the pH of the reaction mass, upon the addition of said polymerization-stopping agent thereto to a maximum of pH 4.

References Cited

UNITED STATES PATENTS

| | | | |
|---|---|---|---|
| 2,662,878 | 12/1953 | Bryant | 260—92.8 |
| 2,922,768 | 1/1960 | Mino et al. | 260—92.8 |
| 3,084,143 | 4/1963 | Hieserman et al. | 260—92.8 |

JOSEPH L. SCHOFER, *Primary Examiner.*

J. A. DONAHUE, *Assistant Examiner.*